Patented Dec. 30, 1924.

1,520,920

UNITED STATES PATENT OFFICE.

VICTOR YNGVE, OF NIAGARA FALLS, NEW YORK.

SALT AND METHOD OF PURIFYING THE SAME.

No Drawing.     Application filed February 13, 1922. Serial No. 536,344.

*To all whom it may concern:*

Be it known that I, VICTOR YNGVE, a citizen of the United States, residing at Niagara Falls, in the county of Niagara and State of New York, have invented certain new and useful Improvements in Salt and Methods of Purifying the Same, of which the following is a specification.

The present invention relates to salt and methods of purifying same.

The invention will be described particularly with reference to table salt, though as the description proceeds it will be apparent that the invention is not limited thereto but has a much broader application. The chief impurities in table salt which cause it to become sticky and lumpy are calcium chloride and magnesium chloride. These substances are deliquescent, that is they absorb moisture from the air. Various expedients have been used for overcoming difficulties due to the sticky and lumpy constituents, such expedients including the addition of a more or less inert powder for the purpose of preventing the particles from adhering. The disadvantages of such expedients are many, not the least important being the fact that the salty taste is reduced.

An object of the present invention is to provide a salt which need not be refined to a state of chemical purity but which will, nevertheless, have removed therefrom the constituents which prevent said salt from running freely.

A further object is to provide a table salt selectively purified to remove constituents which prevent free running, which salt is relatively inexpensive to produce by reason of the fact that so called chemical purity is not required.

A further object is to provide an improved method of purifying salt for the purpose of making same free running.

A further and more general object is to provide an improved method of purifying salt which is relatively inexpensive.

Further objects will appear as the description proceeds.

The starting point of the process involved in the present invention is the brine. This may be of any suitable concentration but will preferably contain about 300 grams of sodium chloride per liter. This brine may be a natural brine or an artificial one made from any available commercial grade of salt and may be previously subjected to pretreatment. A brine which may be used and which may be considered typical, though it is not to be considered in a limiting sense, is the following:

Grams per liter.

| | |
|---|---|
| Sodium | 114. |
| Chlorine | 174.2 |
| Magnesium | .8 |
| Calcium | 1.4 |
| Sulphur trioxide | 3.2 |

To this brine is added sodium hydroxide. The amount of said sodium hydroxide should be in excess of the amount needed to convert the calcium and magnesium present to a hydroxide. This excess may be from 1 to 25 grams per liter. It has been found in practice that an excess of about 10 grams of sodium hydroxide per liter is satisfactory. The mixture is preferably heated to a temperature of about 100° centigrade and the precipitate of calcium hydroxide or magnesium hydroxide, or both, is removed by filtration. The solution may then be neutralized with an acid, preferably hydrochloric acid. This neutralized solution is then evaporated and the salt recovered in any preferred way. The method of recovering the salt from solution need not be described herein inasmuch as such methods are well known to those skilled in the art.

The method of treating the brine may be described as one of causing a large increase in the hydroxyl ions, or in increasing the alkalinity, thereby causing the calcium and magnesium to take the form of very insoluble hydroxides, whereby their removal from solution is simplified. Other methods will occur to those skilled in the art for thus rendering insoluble the content of magnesium and calcium, whereby to simplify the removal of said constituents.

Referring further to the matter of adding the alkali, for example the sodium hydroxide, said alkali may be added by generation of the hydroxide by electrolysis or other suitable method within a portion of the brine or within all of it. Other suitable methods of adding the alkali will also occur to those skilled in the art.

It has been determined that a total percentage of calcium chloride and magnesium chloride as low as .1 per cent is detrimental to the free running qualities of table salt. The present invention, as above outlined, contemplates a product comprising less than 0.02 per cent of the elements calcium and magnesium, present mainly as the chlorides, the percentage of said chlorides being less than 0.05 per cent. The process as above outlined constitutes an economical and efficient method of producing this purified product.

Referring particularly to table salt, it may be stated that there are many substances, such as sodium sulphate, present in the commercial grade of salt which are not detrimental for table use. Chemically pure salt is prohibitively expensive for ordinary table use and presents no practical advantages for table use over the salt contemplated in the present invention. The product contemplated in the present invention is therefore to be distinguished from chemically pure salt inasmuch as said product is very much less expensive than chemically pure salt and presents all the advantages which chemically pure salt would have in table use. It has been found that the salt contemplated in the present invention contains other ingredients than pure salt to the extent of at least five times the total amount of calcium chloride and magnesium chloride present. This figure will vary with different kinds of brine but serves as an illustration of the nature of the product provided by the present invention.

The figures and percentages stated above are subject to wide variation without departing from the scope of the invention. Furthermore, wide variations in the process will occur to those skilled in the art. It is intended in this patent to cover all modifications of the present invention that fall within the scope of the appended claims.

I claim:

1. The process of treating commercial salt containing calcium and magnesium which consists in precipitating said calcium and magnesium in a single step by the addition of an excess of an alkali which will react with said calcium and magnesium to form insoluble hydroxides, removing said hydroxides and neutralizing said mixture.

2. The process of purifying salt containing calcium or magnesium by adding to the brine an alkali which will react with with said constituents to form insoluble hydroxides and removing said insoluble hydroxides, said alkali being added in excess of the amount needed to react with said constituents.

3. The process of purifying salt containing calcium or magnesium by adding to the brine an excess of alkali which will react with said constituents to form insoluble hydroxides, removing said hydroxides and neutralizing said mixture.

4. The process of purifying a brine containing calcium or magnesium which consists in causing a large increase in hydroxyl ions in said brine to convert said calcium and magnesium to the form of hydroxides and removing said calcium and magnesium hydroxides.

5. The process of treating brine containing calcium and magnesium which consists in the generation of an excess of hydroxides within said brine, causing thereby the precipitation of said calcium and magnesium, and removing said calcium and magnesium.

6. The process of treating brine containing deliquescent salts which consists in increasing the alkalinity of said brine to convert said deliquescent salts to the form of hydroxides and removing said hydroxides.

7. The method of purifying brine which consists of converting soluble deliquescent salts to insoluble hydroxides by the addition of an excess of alkali, and removing said insoluble hydroxides.

8. Table salt comprising less than 0.02 per cent of the elements calcium and magnesium present mainly as the chlorides, said chlorides constituting less than one-fifth of the total amount of other impurities.

Signed at Niagara Falls, New York, this 9th day of February, 1922.

VICTOR YNGVE